United States Patent Office 2,818,443
Patented Dec. 31, 1957

2,818,443

POLYHYDROXY COMPOUNDS VIA ANION-EXCHANGE RESIN CATALYZED ALDEHYDE CONDENSATION AND SUBSEQUENT HYDROGENATION

Max O. Robeson, Corpus Christi, Tex., assignor to Celanese Corporation of America, New York, N. Y., a corporation of Delaware No Drawing. Application January 17, 1955
Serial No. 482,397

1 Claim. (Cl. 260—635)

This invention relates to the production of polyhydroxy compounds and is particularly concerned with a process for the production of polyhydroxy compounds by the reaction of formaldehyde with an aliphatic aldehyde containing at least two carbon atoms.

It has long been known that it is possible to prepare polyhydroxy compounds by the reaction of formaldehyde with an aliphatic aldehyde containing at least two carbon atoms. In this way, for example, it is possible to prepare pentaerythritol by the reaction of formaldehyde with acetaldehyde and to prepare trimethylolethane by the reaction of formaldehyde with propionaldehyde. Normally, in carrying out such reactions, the conditions are chosen so that the formaldehyde reacts with the aliphatic aldehyde containing at least two carbon atoms to produce a hydroxy aldehyde, and the said hydroxy aldehyde reacts with a further quantity of the formaldehyde in a Canizarro reaction to produce the final polyhydroxy compound and formic acid. Sufficient alkali, such as sodium hydroxide, is present during the reaction to cause the reaction to proceed and to neutralize the formic acid as it is formed, producing sodium formate. To recover the polyhydroxy compound from the reaction mixture in a form suitable for commercial use, it is necessary to separate it from the sodium formate, which separation step adds significantly to the cost of the final product. Another added expense in producing polyhydroxy compounds by this process lies in the fact that for each mol of product produced, one mol of formaldehyde is lost through conversion to formic acid and one mol of an alkali is required to neutralize the formic acid.

It has been proposed to overcome the difficulties and added expenses of the foregoing process by carrying out the reaction between the formaldehyde and the aliphatic aldehyde containing at least two carbon atoms in the presence of only a catalytic amount of an alkali to produce a hydroxy aldehyde which is then hydrogenated to produce the desired product. This process does offer a considerable advantage in reducing the expense involved in separating the polyhydroxy compound from the reaction mixture. It also offers an economic advantage in reducing the amount of formaldehyde that is lost by conversion to formic acid, and in the quantity of alkali required to neutralize said formic acid. However, the amount of alkali required to catalyze the reaction between the formaldehyde and the aliphatic aldehyde containing at least two carbon atoms is still so large that a considerable amount of formaldehyde reacts with the hydroxy aldehyde first formed in a Canizarro reaction to produce a polyhydroxy compound and formic acid, which latter reacts with the alkali to produce a formate. As a result, fairly extensive purification of the final polyhydroxy compound is required to prepare it for its end use and significant amounts of formaldehyde are converted to formic acid, necessitating neutralization thereof.

It is an important object of this invention to provide an economical process for the production of polyhydroxy compounds which will be free from the foregoing and other disadvantages.

A further object of this invention is to provide a process for the production of polyhydroxy compounds by the reaction of formaldehyde with an aliphatic aldehyde containing at least two carbon atoms in the presence of an anion-exchange resin.

Other objects of this invention will be apparent from the following detailed description and claim.

According to the present invention, formaldehyde is reacted with an aliphatic aldehyde containing at least two carbon atoms, hereinafter called a higher aldehyde, by bringing the said compounds into contact with an anion-exchange resin to catalyze the said reaction. During the reaction between the formaldehyde and the higher aldehyde, very little of the hydroxy aldehyde formed reacts with the formaldehyde to produce a polyhydroxy compound and formic acid. As a result, the recovery of the final products is simplified and the expense thereof reduced. The hydroxy aldehyde produced by the reaction of the formaldehyde with the higher aldehyde is then hydrogenated to convert the aldehyde group to a hydroxyl group, and the polyhydroxy compound may be separated from the reaction mixture. Polyhydroxy compounds can be produced by this process with a minimum of expense and are of extremely high purity so that they are well suited for wide commercial use.

In carrying out the process of this invention, the formaldehyde is reacted with an aliphatic aldehyde containing at least two carbon atoms or preferably between about 2 and 4 carbon atoms. The aldehydes employed in carrying out the reaction are also characterized by having at least one hydrogen atom linked to the carbon atom alpha to the carbonyl group. Suitable aldehydes falling within this class of aldehydes are acetaldehyde, propionaldehyde, n-butyraldehyde, and iso-butyraldehyde. There may be employed a stoichiometric amount of formaldehyde for each mol of higher aldehyde with which said formaldehyde reacts. That is, there may be employed one mol of formaldehyde per hydrogen atom linked to the carbon atom alpha to the carbonyl group in each mol of higher aldehyde. However, better results are achieved both with respect to the yield and purity of the final product, and the ease with which the final product may be recovered from the reaction mixture, if an excess of formaldehyde ranging from about 1.5 to 5 times, or preferably from about 2 to 4 times the stoichiometric quantity is employed. With these proportions, the nature and extent of undesirable side reactions is kept to a minimum.

The reaction is carried out by bringing desired proportions of formaldehyde and higher aldehyde into contact with an anion-exchange resin. Preferably, the formaldehyde, usually in the form of an aqueous solution, and the aliphatic aldehyde containing at least two carbon atoms are mixed and the mixture is caused to flow through a bed of the anion-exchange resin.

While it is possible to carry out the reaction with many different types of anion-exchange resin, the best results have been obtained with the use of an anion-exchange resin containing quaternary ammonium groups. One type of anion-exchange resin which is particularly effective is prepared by reacting a tertiary amine with a haloalkylated cross-linked polymer of an aromatic vinyl compound, such as a chloromethylated copolymer of styrene and divinyl benzene, as described in McBurney, U. S. Patent No. 2,591,573. Other suitable anion-exchange resins are the products obtained by reacting an alkylating agent, such as methyl chloride or dimethyl sulfate, with an amine-containing resin, such as is obtained by the reaction of formaldehyde, aniline and ethylene diamine, Weakly basic anion-exchange resins containing tertiary amine groups, such as the resins obtained by reacting dimethyl amine or other secondary amine with a chloromethylated copolymer of styrene and divinyl benzene, are also suitable.

The desired reaction between the formaldehyde and the higher aldehyde proceeds best at a temperature of between about 15 and 50° C., or preferably at a temperature of between 20 and 30° C. Preferably the reaction is carried out adiabatically, but in some cases it may be desirable to heat or to cool the reaction mixture so long as the temperature limits specified are not exceeded. The rate of flow of the reactants through the anion-exchange resin should be such as to keep the reaction mixture in contact with said anion-exchange resin for between about 30 and 360 minutes, or preferably between about 60 and 120 minutes.

After the reaction mixture has passed through the anion-exchange resin, the hydroxy aldehyde therein is hydrogenated to convert the same to a polyhydroxy compound. It is preferred, however, before carrying out the hydrogenation to remove from the reaction mixture the unreacted formaldehyde contained therein, whereby the hydrogenation will proceed more readily and the separation of the polyhydroxy compound will be facilitated. The removal of the formaldehyde from the reaction mixture may be effected by a distillation of said mixture at superatmospheric pressure or by steam stripping said mixture at atmospheric pressure, or in any other manner. Following the removal of the unreacted formaldehyde, the reaction mixture is hydrogenated, for example, by treating the same with hydrogen at a high superatmospheric pressure and at elevated temperature in the presence of a hydrogenation catalyst, such as Raney nickel. The polyhydroxy compound is then crystallized from the reaction mixture and may, if desired, be recrystallized to improve its purity further. Because of the relatively small quantities of impurities present in the reaction mixture, the recovery of the polyhydroxy compound from such mixture is considerably simplified and there is obtained a final product of extremely high purity.

The anion-exchange resin employed in carrying out this invention is regenerated periodically in conventional manner, for example, by contacting the same with a solution of caustic or sodium carbonate, followed by washing with water.

The process of this invention will now be described specifically in connection with the production of trimethylolethane by the reaction of formaldehyde with propionaldehyde, to which it is specially suited, since the recovery of trimethylolethane from a reaction mixture containing impurities presents special problems.

The following example is given to illustrate this invention further.

Example

A bed of a granular anion-exchange resin containing quaternary ammonium chloride groups, specifically the resin disclosed in the McBurney patent referred to above and sold under the name "Amberlite—IRA-400," is activated by treatment with a 1% by weight aqueous solution of sodium carbonate in such an amount that 18 grams of sodium carbonate are passed through the bed for each liter of resin. There is then passed through said bed at room temperature a mixture of 20 weight percent aqueous formaldehyde and propionaldehyde said mixture containing 8 mols of formaldehyde for each mol of propionaldehyde. The rate of feed of the solution is adjusted so that the reaction mixture remains in contact with the anion-exchange resin for 80 minutes. The effluent from the bed of anion-exchange resin is steam distilled at atmospheric pressure until the formaldehyde content thereof is reduced to 0.1 weight percent. For each 236 parts of hydroxyaldehyde therein there is added to the reaction mixture 100 parts of active Raney nickel and the mixture is hydrogenated at a temperature of 130° C. and at a pressure of 100 pounds per square inch gauge for 2 hours. The hydrogenated product is concentrated by evaporation at 20 inches of vacuum until it reaches a density of 1.05 at which point it contains approximately 50 weight percent solids. The evaporator residue is cooled whereupon trimethylolethane crystallizes out and is recovered by centrifugation. There is recovered an amount of trimethylolethane crystals in this first crop equivalent to a yield of 63 weight percent, based on the propionaldehyde feed. The liquid residue is again processed by evaporation, cooling and centrifugation and there is obtained an amount of second crop trimethylolethane crystals equivalent to a yield of 14.5 weight percent, based on the propionaldehyde feed.

The first and second crops of crystals are combined and crystallized from an equal weight of water. The final dried product melts at 200–202° C., contains only 0.04 weight percent of ash, and has a hydroxyl content of 42.30 weight percent.

It is to be understood that the foregoing detailed description is merely given by way of illustration and that many variations may be made therein without departing from the spirit of my invention.

Having described my invention, what I desire to secure by Letters Patent is:

Process for the production of trimethylolethane which comprises passing an aqueous mixture of propionaldehyde and about 4 to 8 moles of formaldehyde per mole of said propionaldehyde through a strongly basic anion-exchange resin containing quaternary ammonium groups at a temperature of 20 to 30° C. and a contact time of about 60 to 120 minutes, to produce an aqueous hydroxyaldehyde containing excess unreacted formaldehyde, removing said excess formaldehyde, and hydrogenating the hydroxyaldehyde with molecular hydrogen to form trimethylolethane.

References Cited in the file of this patent
UNITED STATES PATENTS

| | | |
|---|---|---|
| Re. 23,584 | Jackson et al. | Nov. 18, 1952 |
| 2,364,925 | Spurlin | Dec. 12, 1944 |
| 2,400,724 | Walker | May 21, 1946 |
| 2,468,718 | Wyler | Apr. 26, 1949 |